(12) United States Patent
Hoinkis et al.

(10) Patent No.: US 12,141,121 B1
(45) Date of Patent: Nov. 12, 2024

(54) CONTEXTUAL MASTER DATA ENTITY DETERMINATION MECHANISM

(71) Applicant: SAP SE, Walldorf (DE)

(72) Inventors: Simon Hoinkis, Zaberfeld (DE); Martin Dreier, St. Leon-Rot (DE); Wais Abdul Hak, Heidelberg (DE)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 18/307,487

(22) Filed: Apr. 26, 2023

(51) Int. Cl.
*G06F 16/23* (2019.01)
*H04L 51/02* (2022.01)
*H04L 51/046* (2022.01)

(52) U.S. Cl.
CPC ........ *G06F 16/235* (2019.01); *G06F 16/2358* (2019.01); *H04L 51/02* (2013.01); *H04L 51/046* (2013.01)

(58) Field of Classification Search
CPC ... G06F 16/235; G06F 16/2358; H04L 51/02; H04L 51/046
See application file for complete search history.

(56) References Cited

U.S. PATENT DOCUMENTS

| | | | | |
|---|---|---|---|---|
| 7,174,370 B1* | 2/2007 | Saini | ......................... | G06F 8/36 |
| | | | | 709/223 |
| 2014/0122619 A1* | 5/2014 | Duan | ...................... | G06F 40/20 |
| | | | | 709/206 |
| 2018/0336897 A1* | 11/2018 | Aggarwal | ............. | G10L 15/222 |
| 2020/0319917 A1* | 10/2020 | Ni | ......................... | G06F 9/4812 |

OTHER PUBLICATIONS

Bray, T. "The JavaScript Object Notation (JSON) Data Interchange Format," Internet Engineering Task Force (IETF), Request for Comments: 8259, Dec. 2017, 16 pages.

* cited by examiner

*Primary Examiner* — Jorge A Casanova
(74) *Attorney, Agent, or Firm* — Mintz Levin Cohn Ferris Glovsky and Popeo, P.C.

(57) ABSTRACT

In some embodiments, there is provided triggering a chat bot session to make a change to a master data entity at a master data store; determining an identity of the master data entity and the master data store associated with the chat bot session by at least extracting context information from an application and/or a user interface; generating, based on the identity of the master data entity and the master data store, a change command to make the change to the master data entity; and sending a change request including the change command to make the change to the master data entity at the master data store. Related systems, methods, and articles of manufacture are also disclosed.

16 Claims, 8 Drawing Sheets

---

Triggering, while using an application including a user interface, a chat bot session to make a change to a master data entity at a master data system 252

Determine an identity of the master data entity and the master data store associated with the chat bot session by at least extracting context information from the application and/or the user interface 254

Generate, based on the identity of the master data entity and the master data store, a change command to make the change to the master data entity 256

Send a change request including the change command to make the change to the master data entity at the master data store 258

CONTEXTUAL MASTER DATA ENTITY DETERMINATION MECHANISM

FIELD

The subject matter described herein generally relates to chat bots.

BACKGROUND

The term "bot" refers to a software-based robot that performs at least one automated task. For example, a bot may be deployed to perform a simple task, while more complex bots, such as chat bots, can be deployed at a help desk or call center to simulate an actual human being responding to questions. Bots may take an unnecessarily long amount of time to perform tasks and respond to requests, as the bot searches across a library of responses to requests. In addition, bots may not have available all of the possible responses necessary to respond to requests. Thus, bots may be unable to respond to a request or may provide incorrect or inaccurate responses to requests if the requests do not exactly match one of the possible responses stored in the library of possible responses, such as when requests are misspelled, synonyms are used, and the like. Bots generally require customized implementations, so that deploying bots across a wide range of applications can require an unnecessarily large amount of integration and customization for each bot and corresponding application interacting with the bot.

SUMMARY

In some implementations, methods and apparatus, including computer program products, are provided for determining the identity of certain master data during a chat bot session. In some implementations, there may be provided a method which may include triggering a chat bot session to make a change to a master data entity at a master data store; determining an identity of the master data entity and the master data store associated with the chat bot session by at least extracting context information from an application and/or a user interface; generating, based on the identity of the master data entity and the master data store, a change command to make the change to the master data entity; and sending a change request including the change command to make the change to the master data entity at the master data store.

In some variations, one or more of the features disclosed herein including the following features can optionally be included in any feasible combination. The chat bot may be triggered while using while using at least one of the application and the user interface. The triggering of the chat bot session may cause a first chat bot user interface to be generated including the change to the master data entity at the master data store. The change may include a modification, a deletion, and/or an update to an attribute of the master data entity at the master data store. The context information may be extracted by a contextual information extractor coupled to the chat bot. The contextual information extractor may extract the context information from the application, wherein the context information comprises a name of the application, a state of the application, and/or metadata associated with the application. The contextual information extractor may extract the context information from the user interface, wherein the context information comprises metadata associated with the user interface, metadata tags associated with the user interface, data presented via the user interface, and/or context information derived based on pattern matching using data presented on the user interface. The determining the identity of the master data entity and the master data store may further include mapping the change to the master data entity using the context information and formatting the change command based on the master data store. The identity of the master data entity may include a key field. The generating the change command may causes a second chat bot user interface to be generated, wherein the second chat bot user interface includes the change command and a first user interface element which when selected causes a release of the change request including the change command to the master data store.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

In some instances a user may via a chat bot want to change a master data entity using a verbal (or written) input from an application or user interface (UI) context that is not intended for changing the master data or its the master data entity. For example, a user may enter one or more commands using a chat bot (e.g., SAP Conversational AI in the Fiori Launchpad, SIRI, Google Assistant, and/or other types of chat bots) to access or make a change to the master data entity. Master data refers to core data of an enterprise, and this core data may exist independently of specific transactions but may be referenced in the transactions. And, master data entity refers to a specific piece of master data. Moreover, the core (or master) data is less likely to change, when compared to the more dynamic transactional data. Examples of master data including master data entities include a product object (e.g., also referred to as an entity or other type of data structure), a customer object, a supplier object, and an employee object.

Referring again to the chat bot example, the chat bot in this example is being used to access or make a change to the master data, such as one or more master data entities. The master data entities may be a part of one or more data models and have corresponding identifying fields, which are also referred to as key fields, attributes, and relationships to other existing entities (which can make them unique). To perform changes to the master data entities, the user may specify via the chat bot the master data entity being addressed for the change by specifying the details that make the master data entity unique (e.g., identifying information, such as a key field, an attribute, and a relationship another existing entity). But without considering the context of the user interface (UI) and/or the context of the application (or chat), the chat bot may not access the correct master data entity or may be prevented from accessing the master data entity.

Figure 1A:
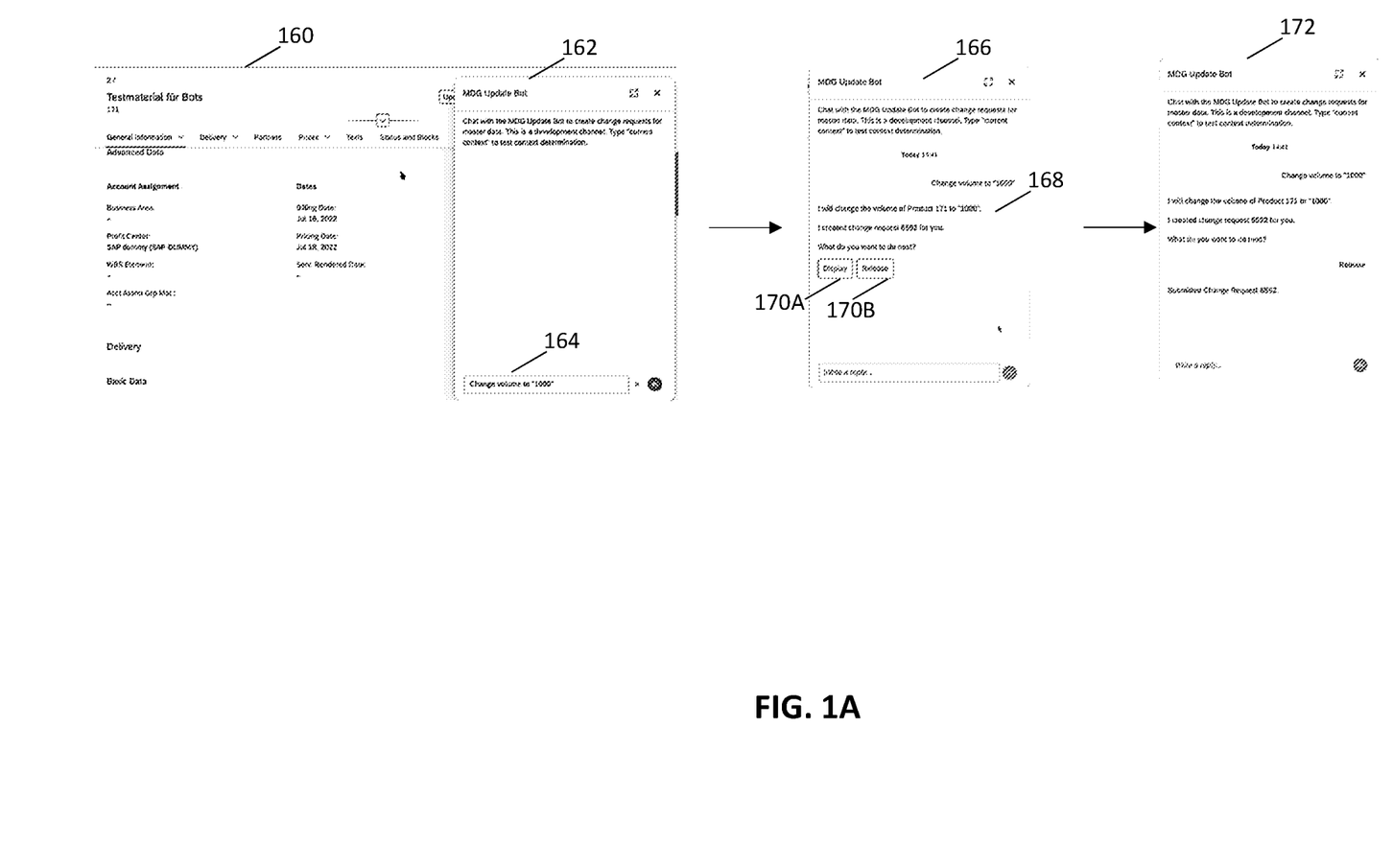
FIG. 1A illustrates examples of chat bot user interfaces, in accordance with some embodiments.

FIG. 1A depicts an example of a user interface 160 for a materials application. In this example, a user accessing the user interface 160 calls up a chat bot 162 to make a change to the master data, such as a master data entity. In this example, the volume 164 is changed to "1000". However, the chat bot does not know the context of the change. Without context information, the chat bot does not know what volume pertains to, which master data record should (or should not be changed), and the like. To illustrate further, the context information from the application itself (e.g., material application, profit center, dates, work break down structure (WBS) element, and/or other context information obtained or derived from the application and/or the user interface) may be used to as context information to identify the master data and master data entities associated with the change.

At chat bot user interface 166 for example, the context information enables the chat bot to identify "product 171" as the product having its volume changed to "1000" 168. The chat bot also indicates that a change request has been created for the change. At this point, the change request can be displayed 170A (so the user can see the change request) and/or released 170B (so the change request is executed at the master data system). At chat bot user interface 172, it is shown the results after the release 170B of the change request. In short, without the proper context information, the chat bot would not be able to identify the proper master data to change.

Before providing additional description of the chat bot and the context data determination mechanism, the following provides a description regarding master data and master data entities.

With respect to master data, master data may comprise one or more master data entities, and there are different "types" of master data entities. Examples of types of master data entities are, as noted, data related to customers, suppliers, employees, and/or the like. The master data entity may have a type of master data entity type. Regarding data models, entities of entity type customers, suppliers, employees, and/or the like may each be a part of a logical domain. For example, a logical domain may be called "partner" for certain customer entity types, or may be called "material" for the entity types related to materials. These logical domains are called data models. An entity type might be redefined or reused across different data models. In other words, a data model may include various elements (e.g., entity types, attributes, and relationships) to enable modeling the structure of the master data.

As noted, a master data entity may include (e.g., have) one or more identifying fields, one or more of which may form an identifier (ID). Examples of the identifying fields include a customer number, a supplier number, an employee number, and/or the like. The ID may thus be used to identify or refer to a specific master data entity. In practice, the ID may be the only practical reference to handle the master data identity. The identifying fields may also be referred to as key fields as identifying fields may be designed to be the key fields of the master data entity type. The uniqueness of the IDs may be unique at a database table level, an application (or a system) level, a system landscape level, and/or universally unique. In the case of a master data system (e.g., a master data governance system) that handles master data across a system landscape (which includes for example one or more systems) of an enterprise, the IDs may be unique at the system landscape level.

Moreover, the master data fields (which are not identifying fields) may be considered "attribute" fields. The attribute fields may include information about an entity. In the example of an entity type "customer" having a name, the name "Adam" may be used across different customers in a company with many customers, so a unique "customer number" may instead be used as an identifying field while the name "Adam" is an attribute. Identifying and attribute fields may also form a name value pair, so each field has a certain name with a corresponding value.

Table 1 below depicts examples of master data entities, each of which includes a data model, an entity type, one or more identifying fields, and one or more attribute fields. Table 2 below is similar to Table 1 but uses sample values. Tables 1 and 2 are simplified for purposes of explanation, so the information in Tables 1 and 2 may exist in a different form or format in a database management system or other type of system (e.g., an entity type may be split among different database tables and/or even systems).

TABLE 1

| Entity No. | Data Model | Entity Type | Identifying Field Name 1 | Identifying Field Name 2 | Attribute Field Name 1 | Attribute Field Name 2 |
| --- | --- | --- | --- | --- | --- | --- |
| 1 | Business Partner | Customer | Customer Number | <Not being used> | Name | Telephone Number |
| 2 | Business Partner | Supplier | Supplier Number | <Not being used> | Name | Telephone Number |
| 3 | Material | Material | Material Number | <Not being used> | Plant | Gross Weight |

TABLE 2

| Entity No. | Data Model | Entity Type | Identifying Field Name 1 | Identifying Field Value 1 | Attribute Field Name 1 | Attribute Field Value 1 | Attribute Field Name 2 | Attribute Field Value 2 |
|---|---|---|---|---|---|---|---|---|
| 1 | Business Partner | Customer | Customer Number | 4711 | Name | Adam | Telephone Number | +49 123 |
| 2 | Business Partner | Supplier | Supplier Number | 4712 | Name | Paul | Telephone Number | +49 456 |
| 3 | Material | Material | Material Number | 4711 | Plant | 0001 | Gross Weight | 100 KG |

The entity types may each have one or more relationships to each other with a certain cardinality that may be dependent on the modelling approach being used by the data model. Referring to Table 1, a telephone number may be modelled as a separate entity with the following cardinalities: the Entity 1 Customer has 0 or 1 telephone numbers; the Entity 1 Customer has 1 telephone number; the Entity 1 Customer has 0 or more telephone numbers.

With respect to context information, when a user accesses an application but does not have access to context information for the application (or its user interface), the context information may be extracted by an application such as a context analyzer (e.g., SAP's CoPilot Contextual Analyzer and/or other types of context analyzers).

Figure 1B:
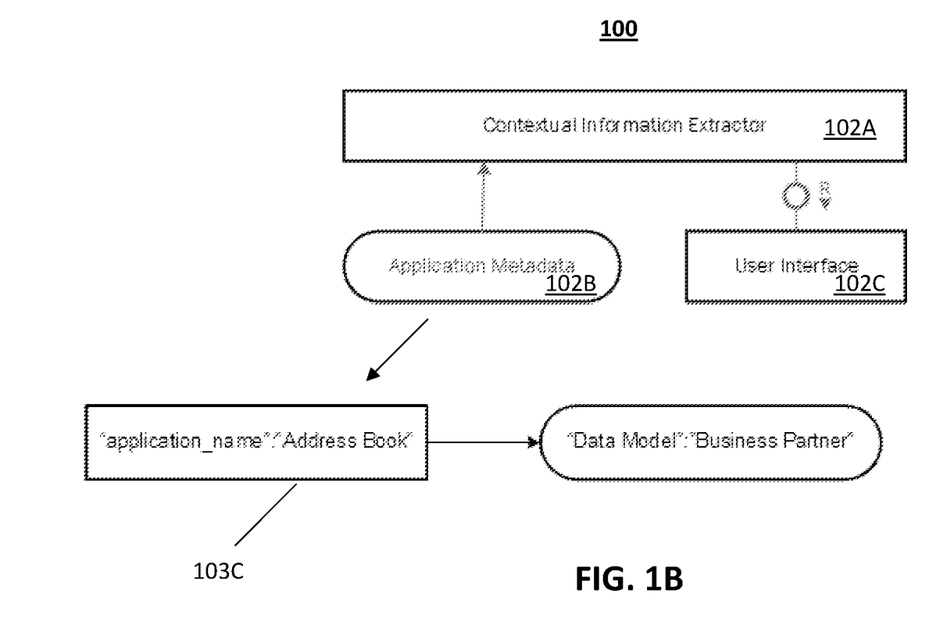
FIG. 1B depicts an example of a contextual analyzer, in accordance with some embodiments.

FIG. 1B depicts an example of a contextual analyzer 100 that includes a contextual information extractor 102A that obtains application metadata 102B and obtains context information from a user interface 102C.

Referring to FIG. 1B at 102C, some user interface (UI) context information may be visible and/or accessible to the user or the chat bot. For example, a user interface may contain visible fields that are either made for input or output of data, such as a telephone number (+49 123), that may be a part of a simple input field at the UI, an output field of the UI, or part of a list presented at the UI. Moreover, there are various ways to interpret whether a value on the UI is a telephone number. For example, the data may match a certain pattern (+49 to start a german telephone number) or other attributes of the UI may indicate that the field is supposed to be a phone number. In HTML for example, the tag <input type="tel"> indicates a phone number or a textual label may be presented at the UI ("Telephone Number" +49 123). As such, UI context information may be obtained either directly from the text and other information presented or indirectly using pattern matching and/or metadata tags.

Referring to FIG. 1B at 102B, the application metadata may comprise data related to the application itself. For example, application metadata may include information regarding how the application is called, what the application is called (e.g., the name or identity of the application), what the state of the application is (e.g., is the application being used, how it is being used, etc.), and/or any other data related to the application itself that can be obtained and used as context information. To illustrate by way of an example, supposing a user accesses an address book application (where some of the contacts are displayed or presented via a UI). In this example, it can be assumed that the user wants to refer to a master data entity type "address" that is part of the data model "business partner" as shown at 103C In this example, the address book application name may also be a part of a food delivery application. If the state of the application indicates that the user is using the food delivery application and is currently displaying the address book, the assumption that the data model of the entity the user is referring to is still the business partner.

Figure 2A:
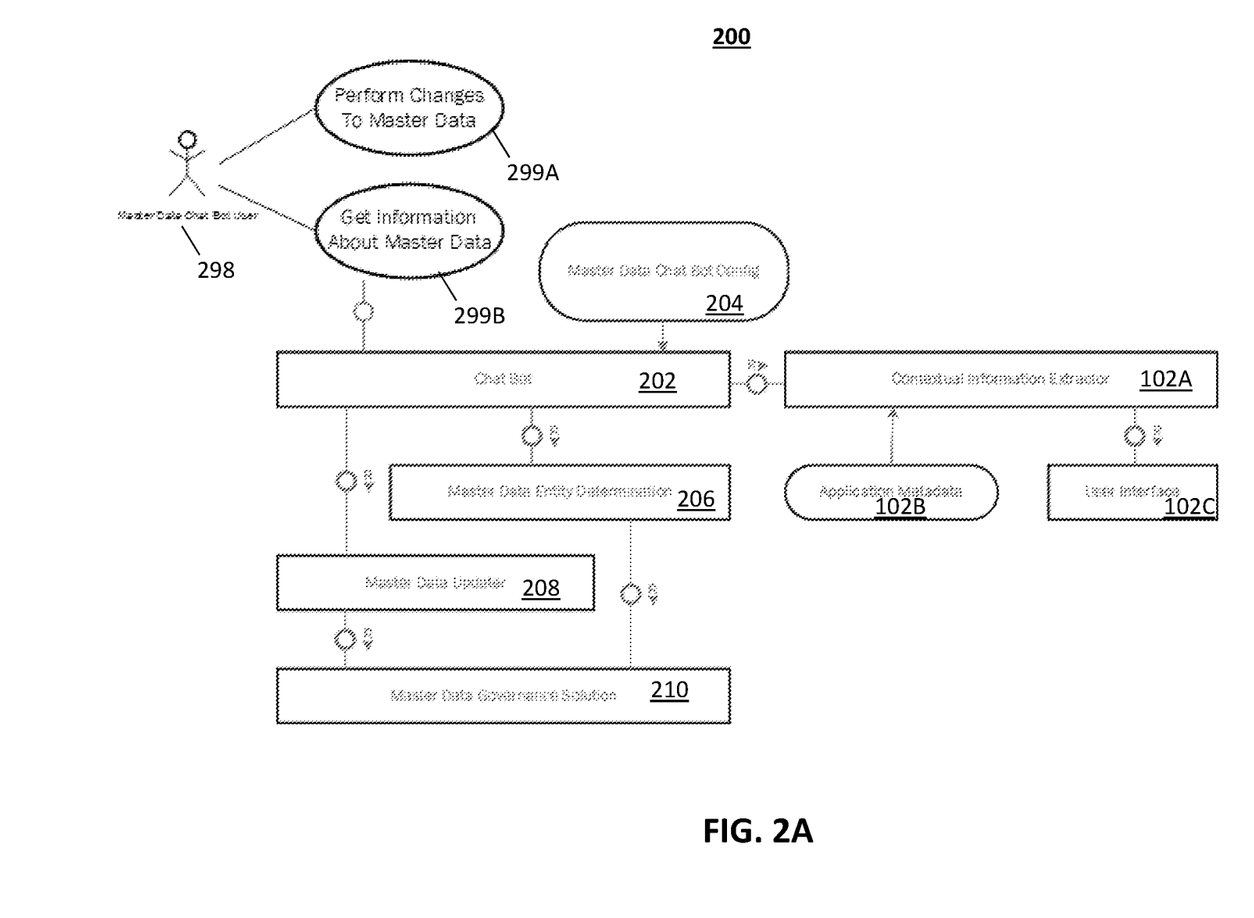
FIG. 2A depicts an example of a system including a context master data entity determination, in accordance with some embodiments.

FIG. 2A depicts an example of a system 200, in accordance with some embodiments. The system 200 may include a chat bot 202, master data chat bot configuration information 204, a contextual information extractor 102A (which accesses application metadata 102B and/or user interface 102C), a master data entity determination 206, a master data updater 208, and a master data system 210 (labeled master data governance solution).

In some embodiments, the master data entity determination 206 may determine which master data is being mentioned (e.g., in text or verbally) by the user 298 via the chat bot 202, so the master data entity determination 206 is responsible for executing the contextual master data entity determination mechanism as disclosed herein. The master data entity determination 206 may have access to the master data system 210 and have the information of the data model being used by the master data entity of the master data system 210. Moreover, the master data entity determination 206 may read the data governed by the master data system. In this way, the master data entity determination 206 may verify the existence of certain master data entities provided by the context and suggesting entities to the user. The master data entity determination 206 may directly determine an available master data entity due to the contextual information or may provide the user 298 to choose between certain master data entities. If for example the user 298 wants to change (e.g., at 299A) the address for example of a business partner provided based on the determined context information, the user may have multiple addresses available, so a clarification regarding which address should be changed may be provided to the chat bot and/or user.

In some embodiments, the chat bot 202 may be configured to use a master data chat bot configuration 204. This master data chat bot configuration information enables the chat bot to understand syntax and commands, such as the commands given by the user 298 of the chat bot. As noted, the commands may be written (e.g., via text) and/or may be provided orally to the chat bot. For example, the chat bot may be configured in SAP's conversational AI to understand written and/or spoken inputs, such as commands including master data governance commands and to orchestrate calls to the master data updater 208 or the master data system 210.

For example, the user 298 may interact with the chat bot 202 to perform changes to the master data 299A or to obtain information about the master data 299B. The phrase chat bot session refers to a session during which a chat bot is being used. For example, the chat bot session can be triggered while using an application and/or user interface to make a change to master data. The system 200 may then access context information, such as the context associated with the application and/or the UI which the user 299A is using in connection with the master data 299A. The context may be extracted by the contextual information extractor 102A, which extracts the application metadata 102B and the user interface information (or metadata) 102C. However, the chat bot does not need to interpret the context. Instead, the context information (which is extracted by the context information extractor 102A) may be provided to the master data entity determination 206. The master data entity determination 206 may then use the extracted context information to determine which master data (e.g., which specific master data entity or entities) are being used by the user 298 or chat bot 202. As such, the overall context of the commands at 299A-B is enhanced to a specific format that the master data updater 208 understands. To illustrate further, when the user 298 accessing the chat bot 202 refers to change volume to "1000" as noted at 164 at FIG. 1A, the master data system 210 may not understand this request or call as "1000" is an external value that needs to be mapped into an internal format for the master data system 210. This mapping may be performed using the extracted context information. By way of another example, how attributes are named may also need to be mapped, so the attribute "volume" may be mapped (using extracted context information) to an internal master data system 210 attribute of "vol" for example.

The master data updater 208 may comprise an interpreter for one or more commands from the chat bot. For example, the master data updater may provide the ability to change master data using the master data system 210. In other words, the master data updater interfaces the master data system 210, so the master data updater is able to receive a command (e.g., change a value of an attribute, delete a value of an attribute, etc.) from the master data entity determination 206 (or chat bot 202) and generate a command to access or make a change at the master data system 210.

The master data system 210 (labeled master data governance solutions) may comprise one or more database instances, one or more persistent stores, and/or the like. An example of a master data system is the SAP Master Data Governance (MDG) system. The master data system may provide (e.g., in response to a request, a query, and/or an API call) information about available data models, entity types, concrete entities, and attributes. Moreover, this information may be accessed and APIs may be used for example to read and change data governed by the master data system. For example, a request, such as a change request, may include one or more changes to one or more master data entities. The change request may provide a customizable workflow to monitor, submit, review, and/or withdraw the changes. Alternatively, or additionally, the master data updater may also retrieve information about master data entities within the master data system 210.

Figure 2B:
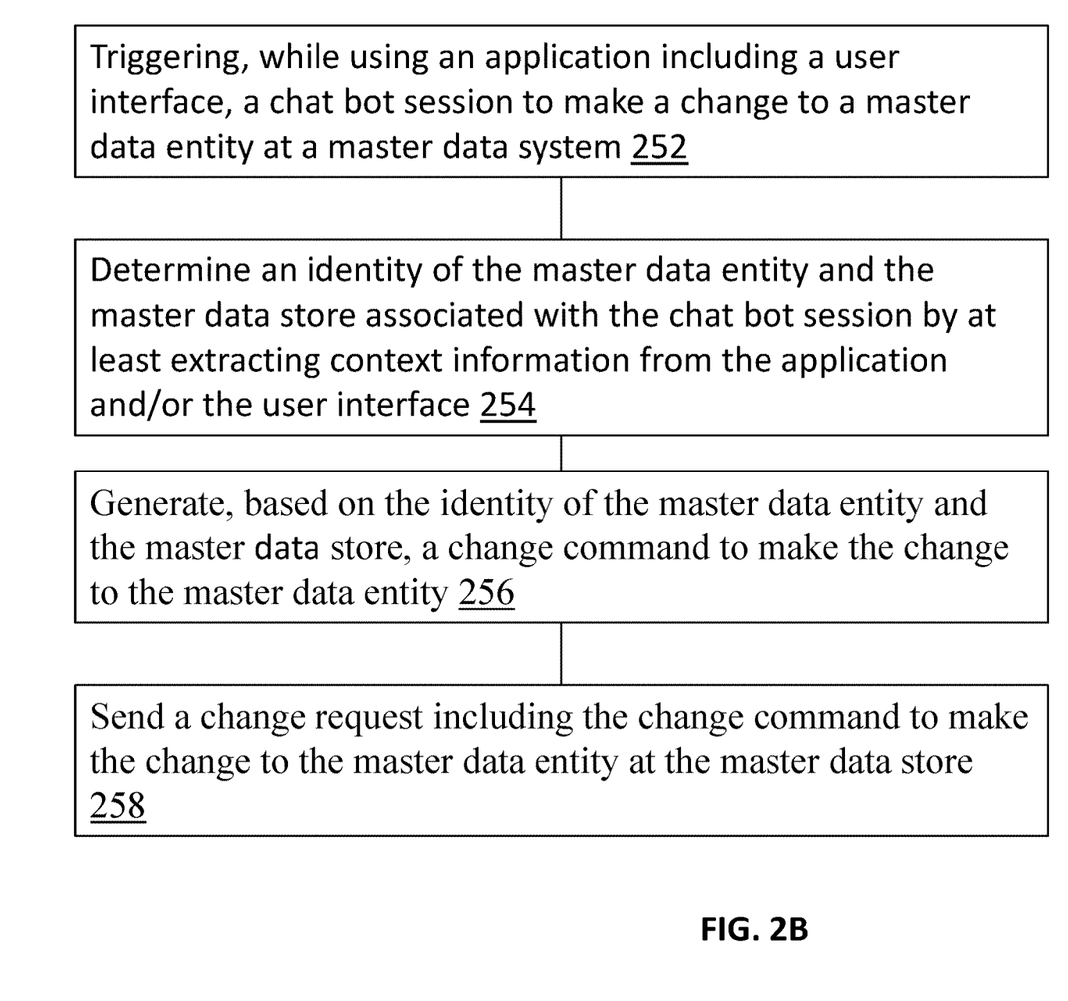
FIG. 2B depicts an example of a process for context master data entity determination, in accordance with some embodiments.

FIG. 2B depicts an example of a process, in accordance with some embodiments.

At 252, while using an application including a user interface, a chat bot session may be triggered to make a change to a master data entity at a master data system, in accordance with some embodiments. While using the application and user interface at 160 (FIG. 1A), a chat bot session may be started to enable a change to a master data entity at a master data system. For example, while using an application, a chat bot may be requested (e.g., with a request, such as a user interface element click, a verbal request/command, and/or the like). The chat bot session may be provided by the chat bot 202. The change may request an update of a value or attribute of a master data entity, a deletion of a value or attribute of a master data entity, a renaming of an attribute value, etc.

At 254, an identity of the master data entity and the master data system may be determined, in accordance with some embodiments. For example, the contextual information extractor 102A may extract context information from the application metadata 102B from the application being used by the user when the chat session is triggered and/or from the user interface 102C metadata. To illustrate further, the context information may identify an application context, such as a material application used to order products for a given customer. This context information enables identifying a specific master data entity at the master data store (e.g., materials, products, etc. linked to the given customer in the master data store).

Based on the identity of the master data entity and the master data store, a change command may be generated, at 256, to make the change to the master data entity, in accordance with some embodiments. For example, the extracted context may be provided to the master data entity determination 206 which as noted identifies the master data entity at a master data system, such as master data system 210. The master data entity determination (or the master data updater 208) may format a change command for the specific master data system being accessed. At 258, this change command may be sent (by the master data entity determination or the master data updater) as part of a change request to the master data system 210.

The following provides additional description regarding the mapping of the context information to target information at the master data system 210. This mapping may be used by the mater data entity determination to identify based on the context certain master data entities.

Figure 3:
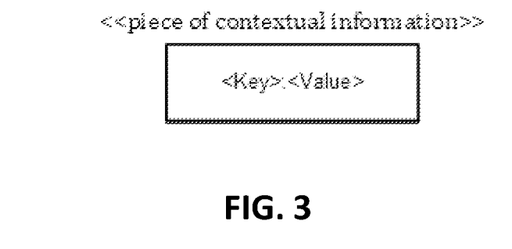
FIGS. 3 and 4 depict examples of context information, in accordance with some embodiments.

As noted, the context information (which may be associated with an application being used by the user 298 and/or the UI (or application) being used by the user 298) may be represented by key-value pairs of key and values. The master data entity determination 206 may receive the context information, which may be represented by a JavaScript Object Notation (JSON) format that is also based on the key value approach as shown at FIG. 3 (although it may be represented in other formats as well).

Figure 4:
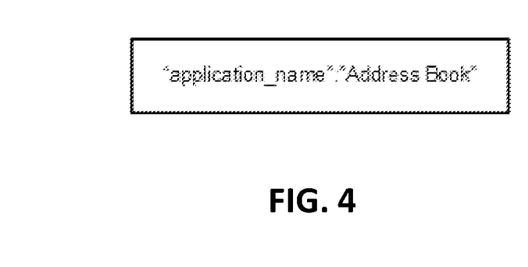
Figure 5:
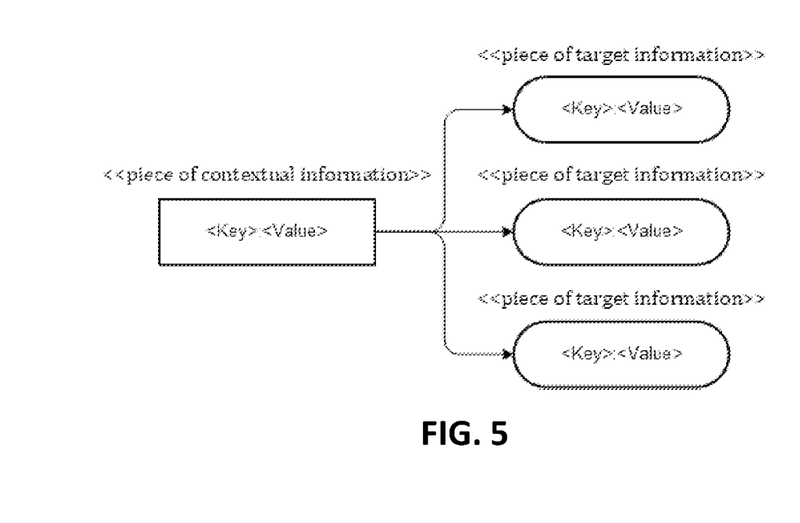
FIGS. 5, 6, 7, and 8 depict examples of context information mapped to target information at a master data store, in accordance with some embodiments.
Figure 6:
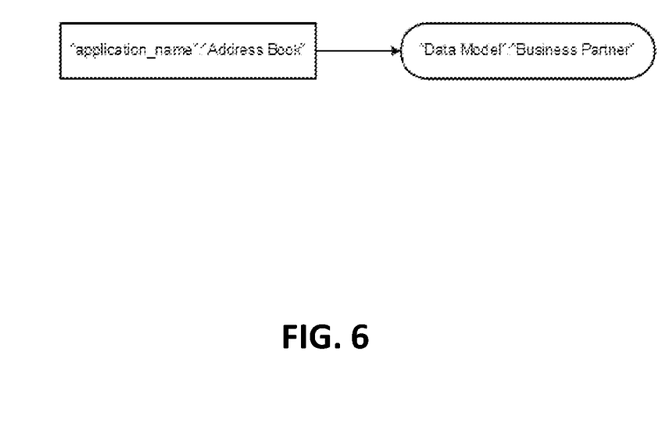

FIG. 4 shows a given piece of contextual information represented by a rectangular shape. The contextual information piece may or may not be mapped to multiple (0 to n) target information pieces. The key and value of a contextual information piece is dependent on the context and may be represented as a string. For example, a key may be "application_name" with a value "Address Book" as shown at FIG. 4. The target information piece may also be represented by a pair of keys and values as shown in the example of FIG. 5, where the target information is represented by oval shapes. As noted, the target information pieces are mapped to contextual information pieces. The arrow at FIG. 5 indicates that the contextual information piece maps to a certain target information piece (e.g., a specific master data entity at a master data store). In the example of FIG. 5, the key of the target information piece refers to one of the following information: a data model, an entity type, an identifying field name, and an attribute field name. And, the value of target information is dependent on the key given and will consider values of the master data governance solution: data model name used in master data solution (if key is data model), entity type name used in data solution (if key is entity type), identifying field value used in master data solution (if key is identifying field name), and attribute field value used in master data solution (if key is attribute field name). FIG. 6 shows an example of the mapping from the context information application_name: Address Book to the target information Data Model:Business Partner.

Figure 7:
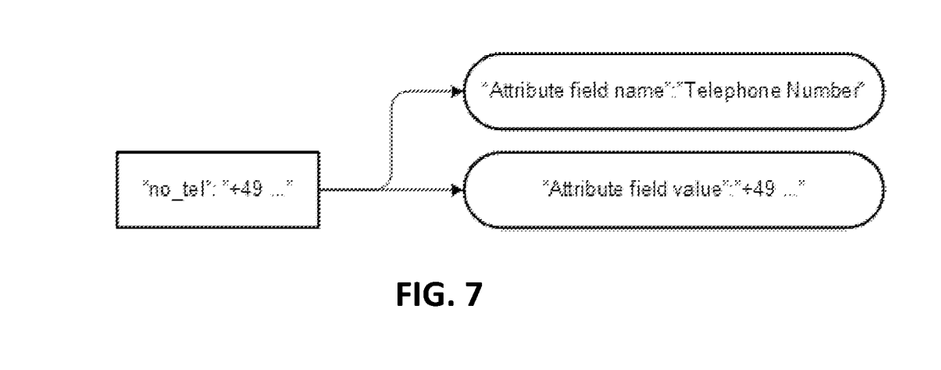
Figure 8:
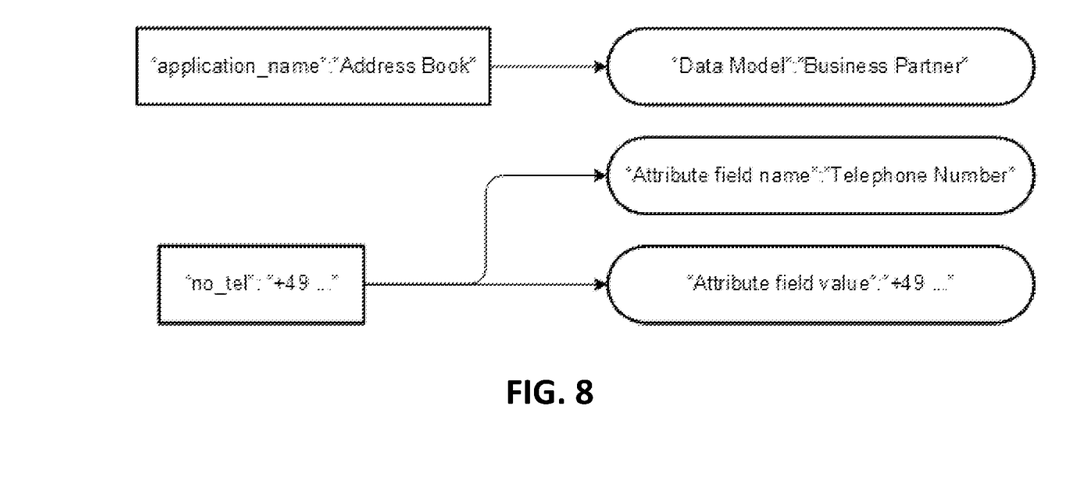

The information regarding which context information piece maps to which target information piece may be determined by the master data entity determination 206 statically, functionally, or a combination of both. For example, the static mapping information may be defined by a configuration that may also be represented in a table as shown at Table 3 below. This can be achieved by having customizing as part of the master data entity determination or simple logic that can be part of methods. The functional mapping information may be extracted using for example data patterns. FIG. 7 shows an example of a data pattern of +49 in the context information value which always maps to a target Information Key "Attribute field name": "Telephone Number" and "Attribute field value": "+49 . . . ". And, a hybrid approach combining aspect of static and functional mapping may also be used. FIG. 8 depicts an example using logic. For example, the contextual information piece "no_tel": "+49 . . . " is attempted to be mapped first in a static way (as in Table 3 above) and if there is no static mapping available, then the value is may be mapped in a functional way (as in FIG. 7), or the functional way may be attempted first and if there is no success the static way may be performed. In the mappings, not every context information piece (which would be mapped by the master data entity determination 206) is available in the contextual information. Referring to FIG. 8 for example, it might be the case that the "application_name": "Address Book" information is available (or might not be available); it may be the case that no mapping information applies as for example no context is available (e.g., due to technical or other reasons).

TABLE 3

| Context Information Key | Context Information Value | Target Information Key | Target Information Value |
| --- | --- | --- | --- |
| application_name | Address Book | Data Model | Business Partner |

A set of master data entities may be considered concrete entities that are available and defined by the corresponding data models and fields. It is use case specific whether attribute fields are returned or not as the identifying fields may be enough to identify a master data entity. The master data entities of the set of master data entities may exist in the master data system 210. This set of entities may comprise zero, one, or more entities. In some embodiments, a threshold may be in place to limit entities found in the master data system 210 to a threshold upper limit. For example, the threshold upper limit may prevent the user 198 from having to search for a specific entity from a set of a thousand different entities.

Referring again to the master data entity determination 206, it maps the contextual information pieces (which are obtained from the extractor 102A) to target information pieces at the master data system 210, in accordance with some embodiments. In some embodiments, the master data entity determination 206 may filter the entities available in the master data system 210. In some embodiments, the master data entity determination 206 may retrieve an entity set according to the filter rules.

As a prerequisite, it may be assumed that the master data system 200 does have all the basic operations and methods to read and search for master data entities data. With respect to the master data entity determination 206 filtering, a filter algorithm may be applied for the search of master data entities at the master data system 200 by sorting every target information piece defined mapped by the contextual information pieces available, and sort them by the key. For example, values with the same key may be filtered as a logical OR. While each group of the same keys may be handled as a logical AND. Table 4 below shows Table 2 above with certain pieces of target information.

TABLE 4

| Entity No. | Data Model | Entity Type | Identifying Field Name 1 | Identifying Field Value 1 | Attribute Field Name 1 | Attribute Field Value 1 | Attribute Field Name 2 | Attribute Field Value 2 |
| --- | --- | --- | --- | --- | --- | --- | --- | --- |
| 1 | Business Partner | Customer | Customer Number | 4711 | Name | Adam | Telephone Number | +49 123 |
| 2 | Business Partner | Supplier | Supplier Number | 4712 | Name | Paul | Telephone Number | +49 456 |
| 3 | Material | Material | Material Number | 4711 | Plant | 0001 | Gross Weight | 100 KG |

In the case of Table 4, the entity at 1 and 2 both have the data model Business Partner and both become master data entities that are returned by master data entity determination 206. Applying a hybrid mapping to Table 2 with the given "tel_no": "+49 123" yields Table 5 below.

TABLE 5

| Entity No. | Data Model | Entity Type | Identifying Field Name 1 | Identifying Field Value 1 | Attribute Field Name 1 | Attribute Field Value 1 | Attribute Field Name 2 | Attribute Field Value 2 |
| --- | --- | --- | --- | --- | --- | --- | --- | --- |
| 1 | Business Partner | Customer | Customer Number | 4711 | Name | Adam | Telephone Number | +49 123 |
| 2 | Business Partner | Supplier | Supplier Number | 4712 | Name | Paul | Telephone Number | +49 456 |
| 3 | Material | Material | Material Number | 4711 | Plant | 0001 | Gross Weight | 100 KG |

With the Telephone Number+49 123, only entity 1 is part of the master data entity set. The data model is compared which is correct for entity number 1 and 2. The attribute field names may also be considered. In this example, there is no further check necessary for entity number 3. To illustrate further with additional column checks: column Attribute Field Name 1 and Attribute Field Name 2 are checked to be a Telephone Number. Since none of the columns qualifies for this attribute entity, number 3 shall not be part. The same applies for the attribute field values of entity 3, none of the values matches with the number given which would remove entity 3 from the result entity set. For entity number 2, the data model is correct and a attribute Telephone Number can be found. None of the attribute field values applies as "Paul" is not the searched phone number and +49 456 is a Telephone Number, but not the searched number. Which means that only entity 1 is returned in the master data entity set. As an optimization, the values Paul, 0001 or 100 kg would most likely not be compared to the phone number, as they would not match the same data format.

Table 6 below shows filtering by two data models. Both data models are considered and in the set via a logical OR, therefore all 3 entities are part of the result entity set. This is the same result as if the filtering would be done without any target information piece.

For example, on a user's screen there may be values visible that are just external representations to the user rather than internal representations as stored in the master data store. To illustrate, a customer with number 4711 may not be available with 4711 on the master data store but instead may be stored internally with leading zeros such as 0000004711. Users may not know these internal details of the underlying master data governance solution. The determination of master data entities can therefore also perform a mapping between the external data to internal formats.

Figure 10:
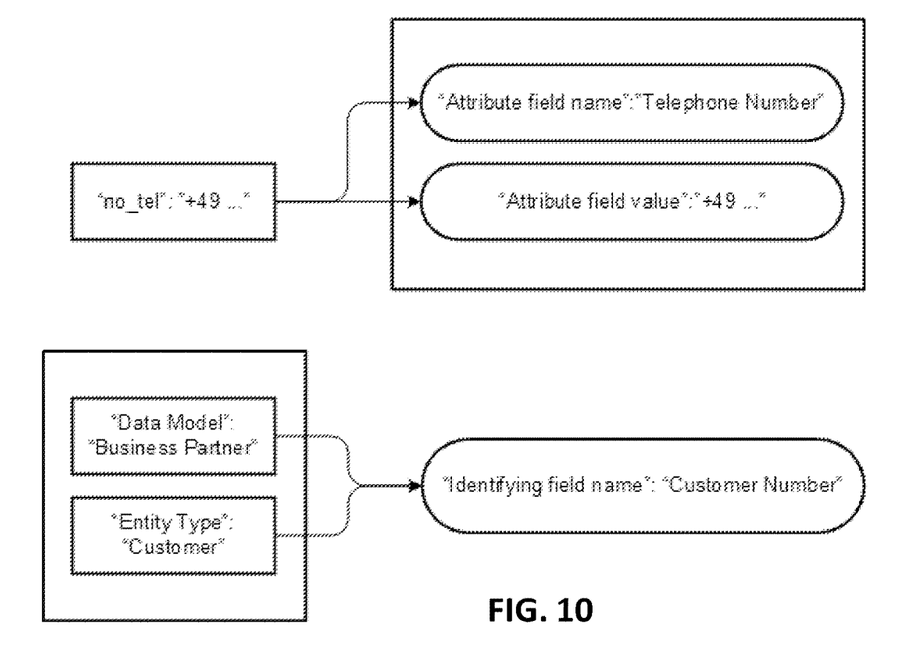
FIG. 10 depicts another example of context information mapped to target information at a master data store, in accordance with some embodiments.

In some embodiments, logic may be used to group certain pieces of information. Referring to FIG. 10, the target information pieces with key "Attribute field name" and "Attribute field value" are building a group if the oval is surrounded by rectangular shape. This means that there could be logic in place focusing on this group of information. During the determination of Table 5 for example, every field is checked for a certain value. When referring to a semantical group it is possible to introduce a logic to only check the field with name "Telephone Number" for the value "+49 . . . ". So the values are not semantically independent. The same applies for contextual information pieces. It is possible to define a mapping that multiple contextual information pieces will map to other target information pieces. The contextual information piece grouping might be part of

TABLE 6

| Entity No. | Data Model | Entity Type | Identifying Field Name 1 | Identifying Field Value 1 | Attribute Field Name 1 | Attribute Field Value 1 | Attribute Field Name 2 | Attribute Field Value 2 |
|---|---|---|---|---|---|---|---|---|
| 1 | Business Partner | Customer | Customer Number | 4711 | Name | Adam | Telephone Number | +49 123 |
| 2 | Business Partner | Supplier | Supplier Number | 4712 | Name | Paul | Telephone Number | +49 456 |
| 3 | Material | Material | Material Number | 4711 | Plant | 0001 | Gross Weight | 100 KG |

Figure 9:
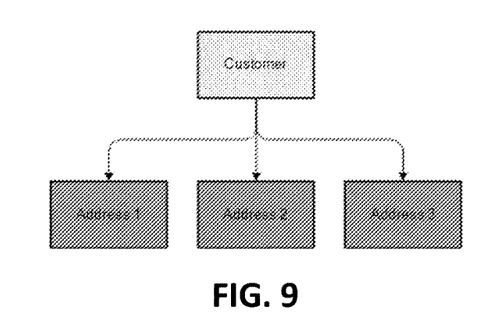
FIG. 9 depicts an example of associations between master data entities, in accordance with some embodiments.

In some cases, the commands at 299A-B may require consideration of the relationships between master data entities. If for example a master data entity of type Customer is found as shown at FIG. 9, this could be for example entity with number 1 and a user command is given to search for addresses it shall be searched in the entity hierarchy. There are additional target information pieces available that might not part of the context and therefore also not considered in the context information. These target information pieces may be considered after the initial context information has been analysed. In the example of FIG. 9, the target information piece extracted by the command to search for an address is "Entity Type": "Address". The determination of the corresponding addresses requires advanced access and support by the master data system 210.

Moreover, the master data system 210 may have a 1 to 1 relationships due to the modelling of entity types which make it necessary to consider another entity than the one found in the context. If the command indicates for example a field that is not available in the entity found in the context, this is a typical example where a further search through the hierarchy is being useful. In other words, the determination mechanism of an entity does not have to end with the information given in contextual information but can further advance through the data model of the found entities due to other information available in for example commands in chat bots.

The concept of a data transformation is noted above (at least implicitly) by the mapping functionality noted above.

the processing logic of the target information piece mapping. The target information piece grouping can be created by introducing a new key like "group <semantical class> <number>" and the values referring to the target information pieces grouped. The <semantical class> may describe the semantical class which tells the determination logic how to deal with this group while the number will indicate how many of the groups exist and to which group an attribute belongs.

Figure 11:
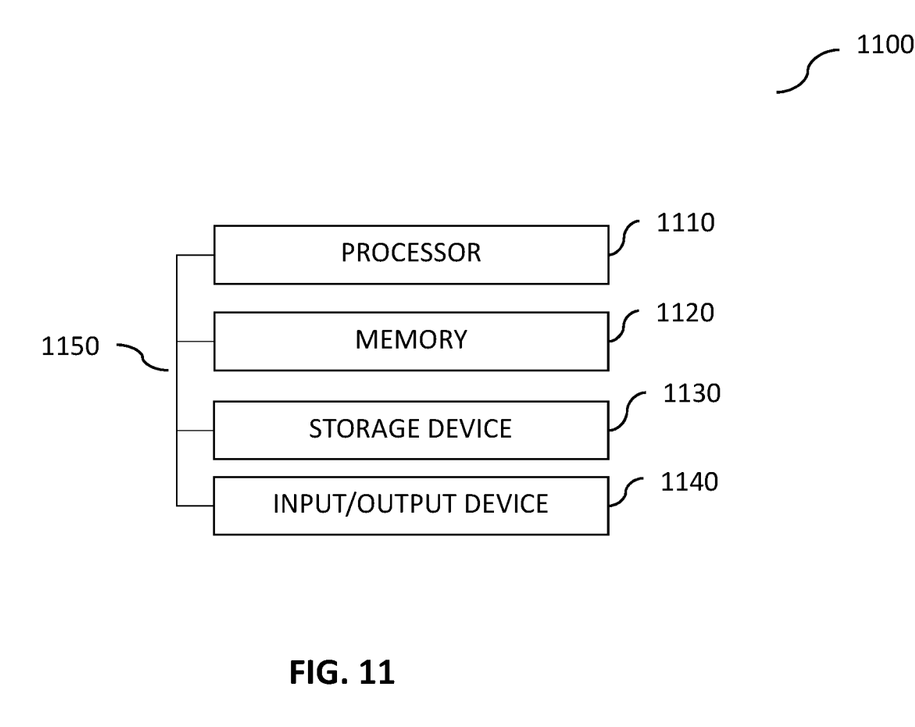
FIG. 11 depicts an example of a system, in accordance with some embodiments.

In some implementations, the current subject matter may be configured to be implemented in a system 1100, as shown in FIG. 11. For example, the one or more aspects of FIG. 2A (e.g., chat bot, contextual information extractor, and/or the like) may be at least in part physically comprised on system 1100. To illustrate further system 1100 may further an operating system, a hypervisor, and/or other resources, to provide virtualize physical resources (e.g., via virtual machines). The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor.

The processor 1110 may be further configured to process instructions stored in the memory 1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A computer-implemented method, comprising: triggering a chat bot session to make a change to a master data entity at a master data store; determining an identity of the master data entity and the master data store associated with the chat bot session by at least extracting context information from an application and/or a user interface; generating, based on the identity of the master data entity and the master data store, a change command to make the change to the master data entity; and sending a change request including the change command to make the change to the master data entity at the master data store.

Example 2: The computer-implemented method of Example 1, wherein the chat bot is triggered while using while using at least one of the application and the user interface.

Example 3: The computer-implemented method of any of Examples 1-2, wherein the triggering the chat bot session causes a first chat bot user interface to be generated including the change to the master data entity at the master data store.

Example 4: The computer-implemented method of any of Examples 1-3, wherein the change comprises a modification, a deletion, and/or an update to an attribute of the master data entity at the master data store.

Example 5: The computer-implemented method of any of Examples 1-4, wherein the context information is extracted by a contextual information extractor coupled to the chat bot.

Example 6: The computer-implemented method of any of Examples 1-5, wherein the contextual information extractor extracts the context information from the application, wherein the context information comprises a name of the application, a state of the application, and/or metadata associated with the application.

Example 7: The computer-implemented method of any of Examples 1-6, wherein the contextual information extractor extracts the context information from the user interface, wherein the context information comprises metadata associated with the user interface, metadata tags associated with the user interface, data presented via the user interface, and/or context information derived based on pattern matching using data presented on the user interface.

Example 8: The computer-implemented method of any of Examples 1-7, wherein the determining the identity of the master data entity and the master data store further comprises mapping the change to the master data entity using the context information and formatting the change command based on the master data store.

Example 9: The computer-implemented method of any of Examples 1-8, wherein the identity of the master data entity comprises a key field.

Example 10: The computer-implemented method of any of Examples 1-9, wherein the generating the change command causes a second chat bot user interface to be generated, wherein the second chat bot user interface includes the change command and a first user interface element which when selected causes a release of the change request including the change command to the master data store.

Example 11: A system comprising: at least one processor; and at least one memory including instructions which when executed by the at least one processor causes operations comprising: triggering a chat bot session to make a change to a master data entity at a master data store; determining an identity of the master data entity and the master data store associated with the chat bot session by at least extracting context information from an application and/or a user interface; generating, based on the identity of the master data entity and the master data store, a change command to make the change to the master data entity; and sending a change request including the change command to make the change to the master data entity at the master data store.

Example 12: The system of claim 11, wherein the chat bot is triggered while using while using at least one of the application and the user interface.

Example 13: The system of any of Examples 11-12, wherein the triggering the chat bot session causes a first chat bot user interface to be generated including the change to the master data entity at the master data store.

Example 14: The system of any of Examples 11-13, wherein the change comprises a modification, a deletion, and/or an update to an attribute of the master data entity at the master data store.

Example 15: The system of any of Examples 11-14, wherein the context information is extracted by a contextual information extractor coupled to the chat bot.

Example 16: The system of any of Examples 11-15, wherein the contextual information extractor extracts the context information from the application, wherein the context information comprises a name of the application, a state of the application, and/or metadata associated with the application.

Example 17: The system of any of Examples 11-16, wherein the contextual information extractor extracts the context information from the user interface, wherein the context information comprises metadata associated with the user interface, metadata tags associated with the user interface, data presented via the user interface, and/or context information derived based on pattern matching using data presented on the user interface.

Example 18: The system of any of Examples 11-17, wherein the determining the identity of the master data entity and the master data store further comprises mapping the change to the master data entity using the context information and formatting the change command based on the master data store.

Example 19: The system of any of Examples 11-18, wherein the generating the change command causes a second chat bot user interface to be generated, wherein the second chat bot user interface includes the change command and a first user interface element which when selected causes a release of the change request including the change command to the master data store.

Example 20: A non-transitory computer-readable storage medium including instructions which when executed by at least one processor causes operations comprising: triggering a chat bot session to make a change to a master data entity at a master data store; determining an identity of the master data entity and the master data store associated with the chat bot session by at least extracting context information from an application and/or a user interface; generating, based on the identity of the master data entity and the master data store, a change command to make the change to the master data entity; and sending a change request including the change command to make the change to the master data entity at the master data store.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   triggering a chat bot session to make a change to a master data entity at a master data store;

determining an identity of the master data entity and the master data store associated with the chat bot session by at least extracting context information from an application and/or a user interface, wherein the context information is extracted by a contextual information extractor coupled to a chat bot, wherein the contextual information extractor extracts the context information from the application, wherein the context information comprises a name of the application, a state of the application, and/or metadata associated with the application;

generating, based on the identity of the master data entity and the master data store, a change command to make the change to the master data entity; and sending a change request including the change command to make the change to the master data entity at the master data store.

2. The computer-implemented method of claim 1, wherein the chat bot session is triggered while using while using at least one of the application and the user interface.

3. The computer-implemented method of claim 1, wherein the triggering the chat bot session causes a first chat bot user interface to be generated including the change to the master data entity at the master data store.

4. The computer-implemented method of claim 1, wherein the change comprises a modification, a deletion, and/or an update to an attribute of the master data entity at the master data store.

5. The computer-implemented method of claim 1, wherein the contextual information extractor extracts the context information from the user interface, wherein the context information comprises metadata associated with the user interface, metadata tags associated with the user interface, data presented via the user interface, and/or context information derived based on pattern matching using data presented on the user interface.

6. The computer-implemented method of claim 1, wherein the determining the identity of the master data entity and the master data store further comprises mapping the change to the master data entity using the context information and formatting the change command based on the master data store.

7. A system comprising:
at least one processor; and
at least one memory including instructions which when executed by the at least one processor causes operations comprising:
triggering a chat bot session to make a change to a master data entity at a master data store;
determining an identity of the master data entity and the master data store associated with the chat bot session by at least extracting context information from an application and/or a user interface, wherein the context information is extracted by a contextual information extractor coupled to a chat bot, wherein the contextual information extractor extracts the context information from the application, wherein the context information comprises a name of the application, a state of the application, and/or metadata associated with the application;
generating, based on the identity of the master data entity and the master data store, a change command to make the change to the master data entity; and
sending a change request including the change command to make the change to the master data entity at the master data store.

8. The computer-implemented method of claim 1, wherein the generating the change command causes a second chat bot user interface to be generated, wherein the second chat bot user interface includes the change command and a first user interface element which when selected causes a release of the change request including the change command to the master data store.

9. A system comprising:
at least one processor; and
at least one memory including instructions which when executed by the at least one processor causes operations comprising:
triggering a chat bot session to make a change to a master data entity at a master data store;
determining an identity of the master data entity and the master data store associated with the chat bot session by at least extracting context information from an application and/or a user interface, wherein the context information is extracted by a contextual information extractor coupled to a chat bot, wherein the contextual information extractor extracts the context information from the application, wherein the context information comprises a name of the application, a state of the application, and/or metadata associated with the application;
generating, based on the identity of the master data entity and the master data store, a change command to make the change to the master data entity; and
sending a change request including the change command to make the change to the master data entity at the master data store.

10. The system of claim 9, wherein the chat bot is triggered while using while using at least one of the application and the user interface.

11. The system of claim 9, wherein the triggering the chat bot session causes a first chat bot user interface to be generated including the change to the master data entity at the master data store.

12. The system of claim 9, wherein the change comprises a modification, a deletion, and/or an update to an attribute of the master data entity at the master data store.

13. The system of claim 9, wherein the contextual information extractor extracts the context information from the user interface, wherein the context information comprises metadata associated with the user interface, metadata tags associated with the user interface, data presented via the user interface, and/or context information derived based on pattern matching using data presented on the user interface.

14. The system of claim 9, wherein the determining the identity of the master data entity and the master data store further comprises mapping the change to the master data entity using the context information and formatting the change command based on the master data store.

15. The system of claim 9, wherein the generating the change command causes a second chat bot user interface to be generated, wherein the second chat bot user interface includes the change command and a first user interface element which when selected causes a release of the change request including the change command to the master data store.

16. A non-transitory computer-readable storage medium including instructions which when executed by at least one processor causes operations comprising:
triggering a chat bot session to make a change to a master data entity at a master data store;
determining an identity of the master data entity and the master data store associated with the chat bot session by at least extracting context information from an application and/or a user interface, wherein the context information is extracted by a contextual information extractor coupled to a chat bot, wherein the contextual information extractor extracts the context information from the application, wherein the context information comprises a name of the application, a state of the application, and/or metadata associated with the application;

generating, based on the identity of the master data entity and the master data store, a change command to make the change to the master data entity; and sending a change request including the change command to make the change to the master data entity at the master data store.

\* \* \* \* \*